United States Patent
Fleischer et al.

(10) Patent No.: US 11,281,745 B2
(45) Date of Patent: Mar. 22, 2022

(54) HALF-PRECISION FLOATING-POINT ARRAYS AT LOW OVERHEAD

(71) Applicant: International Business Machines Corporation, Armonk, NY (US)

(72) Inventors: Bruce Fleischer, Bedford Hills, NY (US); Jose E. Moreira, Irvington, NY (US); Joel A. Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/542,447

(22) Filed: Aug. 16, 2019

(65) Prior Publication Data

US 2021/0049230 A1    Feb. 18, 2021

(51) Int. Cl.
*G06F 17/16*    (2006.01)
*G06F 7/544*    (2006.01)

(52) U.S. Cl.
CPC ............ *G06F 17/16* (2013.01); *G06F 7/5443* (2013.01)

(58) Field of Classification Search
CPC ............................... G06F 17/16; G06F 7/5443
See application file for complete search history.

(56) References Cited

U.S. PATENT DOCUMENTS

| | | | |
|---|---|---|---|
| 6,353,843 B1 | 3/2002 | Chehrazi et al. | |
| 7,974,996 B1 | 7/2011 | North et al. | |
| 8,271,572 B2 | 9/2012 | Fam | |
| 9,098,332 B1* | 8/2015 | Langhammer | G06F 7/5324 |
| 9,411,554 B1 | 8/2016 | Young et al. | |
| 9,703,531 B2 | 7/2017 | Lutz et al. | |
| 2011/0202585 A1 | 8/2011 | Fam | |
| 2017/0139677 A1 | 5/2017 | Lutz et al. | |
| 2018/0032312 A1 | 2/2018 | Hansen et al. | |
| 2018/0095935 A1* | 4/2018 | Ben-Dayan Rubin | G06F 17/16 |

FOREIGN PATENT DOCUMENTS

WO        2018057127 A1    3/2018

OTHER PUBLICATIONS

Courbariaux, et al., "Training Deep Neural Networks With Low Precision Multiplications", ICLR, Sep. 23, 2015, pp. 1-10.

* cited by examiner

*Primary Examiner* — Michael D. Yaary
(74) *Attorney, Agent, or Firm* — Scully, Scott, Murphy & Presser, P.C.; Daniel P. Morris (57) ABSTRACT

Methods and systems of matrix multiplication are described. In an example, a processor can multiply a first entry of a first vector of a first data array with a second vector of a second data array to generate a third vector of a third data array. The processor can store the third vector of the third data array in the second register file. The processor can multiply a second entry of the first vector with the second vector to generate a fourth vector of the third data array. The processor can store the fourth vector of the third data array in the second register file. The processor can combine vectors of the third data array that are stored in the second register file to produce the third data array.

20 Claims, 5 Drawing Sheets

HALF-PRECISION FLOATING-POINT ARRAYS AT LOW OVERHEAD

BACKGROUND

The present disclosure relates in general to multiplier circuits, and more specifically, to multiplier circuits that employ an accumulator register file.

Various circuitry can be used to perform arithmetic operations, such as matrix multiplications or multiply-accumulate (MAC) operations. A performance of the circuitry can be dependent on a speed in which the circuitry performs the arithmetic operations. Additional hardware can be implemented with the circuitry to accelerate these arithmetic operations.

SUMMARY

In some examples, an apparatus configured to perform matrix multiplication is generally described. The apparatus can include a register file and a circuitry coupled to the register file. The circuitry can include a plurality of execution blocks. A first set of execution blocks among the plurality of execution blocks can be operable to generate a first vector of an outer product between a first data array and a second data array, and store the first vector in the register file. A second set of execution blocks among the plurality of execution blocks can be operable to generate a second vector of the outer product between the first data array and the second data array in parallel with the generation of the first vector by the first set of execution blocks, and store the second vector in the register file.

In some examples, a system configured to perform matrix multiplication is generally described. The system can include a processor, a first register file configured to be in communication with the processor, and a second register file configured to be in communication with the processor. The first register file can be configured to store a first data array and a second data array. The processor can be configured to multiply a first entry of a first vector of the first data array with a second vector of the second data array to generate a third vector of a third data array. The processor can be further configured to store the third vector of the third data array in the second register file. The processor can be further configured to multiply a second entry of the first vector with the second vector to generate a fourth vector of the third data array. The processor can be further configured to store the fourth vector of the third data array in the second register file. The processor can be further configured to combine vectors of the third data array that are stored in the second register file to produce the third data array.

In some examples, a computer-implemented method for multiplying matrices is generally described. The method can include multiplying, by a processor, a first entry of a first vector of a first data array with a second vector of a second data array to generate a third vector of a third data array. The method can further include storing, by the processor, the third vector of the third data array in the second register file. The method can further include multiplying, by the processor, a second entry of the first vector with the second vector to generate a fourth vector of the third data array. The method can further include storing, by the processor, the fourth vector of the third data array in the second register file. The method can further include combining, by the processor, vectors of the third data array that are stored in the second register file to produce the third data array.

Further features as well as the structure and operation of various embodiments are described in detail below with reference to the accompanying drawings. In the drawings, like reference numbers indicate identical or functionally similar elements.

DETAILED DESCRIPTION

A multiply-accumulate (MAC) operation can be used to multiply two matrices. In an example, a first matrix denoted as A can have n rows and m columns, and a second matrix denoted as B can have m rows and p columns. A multiplication of A and B will result in a product C that has n rows and p columns. Multiplication of A and B can be achieved by multiple iterations of generating an intermediary product known as the outer product, and accumulating the generated outer products to a partial matrix product generated from previous iterations. An outer product, which is a matrix, is generated by multiplying a column vector of A with a row vector of B. Note that a row vector of A multiplying a column vector of B is a scalar product instead of a matrix or outer product. At the end of each iteration, the partial matrix product is inputted into a next iteration for accumulation. For example, a first iteration can include multiplying a first column of A with a first row of B to generate a first outer product (e.g., a first partial matrix product that may be a matrix). This first partial matrix product can be inputted to a next iteration, to be added to a second outer product generated by multiplying a second column of A with a second row of B. The multiplication and accumulation continues until all iterations are complete, and the result of the last iteration can be outputted as a product of matrices A and B. In an example, at an iteration i, a MAC operation can produce an element $C_{n,p,i}$ at row n and column p of an outer product $C_i$, where $C_{n,p,i}$ is a sum of $C_{n,p,i-1}$, (an element at row n and column p of an outer product generated from a previous iteration i−1) and a product of an element $A_{n,i}$ of A and an element $B_{i,p}$ of B. Therefore, each iteration i can include n×p MAC operations. In an example, if A is a 8×8 matrix and B is a 8×8 matrix, then there are 8 outer products (and 8 iterations), where 64 MAC operations are performed at each iteration, and each outer product can be a 8×8 matrix including 64 elements.

To be described in more detail below, the methods and systems described in accordance with the present disclosure provides an accumulation facility to accelerate processors and devices configured to perform the MAC operation. The accumulation facility can be integrated and/or embedded into existing processors and devices to provide a feature of performing multiple iterations of multiplications and accumulation in plurality, and storing all entries of all outer products generated during the MAC operation. Further, a system being integrated with the accumulation facility can be implemented to improve an efficiency for various applications, such as machine learning applications, big data analysis, and various other data analysis and data processing applications. Furthermore, in some examples, a cost of hardware can dependent on a precision of data (e.g., data in floating point format) being processed by a multiplier circuit—the higher the precision, the more hardware may be required, which increases costs, data processing time, and can also penalize device sizing. To improve efficiency with optimal cost and device size, a device can be designed to have less hardware components to perform arithmetic with reduced precision, such as the MAC operation. A processor or device integrated with the accumulation facility described herein can perform half-word (or 16-bit) multiplication, instead of full-word (or 32-bit) multiplication, to achieve acceptable accuracy with reduced precision. For example, an accuracy of a machine learning application can be maintained when the precision of individual computations is changed from 32-bit to 16-bit floating point.

In an example embodiment, the accumulation facility to be described below can include a new accumulator facility, such as a new register file, being added to a processor, a system, or a device, where the new register file can be used to store the outer products generated during the MAC operation. In another embodiment, the accumulation facility can include partitioning a register file (e.g., an existing register file of a processor) into multiple banks or partitions, and using the multiple banks to store the outer products generated during the MAC operation. By using the accumulation facility described herein to store the outer products, a plurality of multiplications between vectors of matrices A and B can be performed in parallel, thus improving efficiency. For example, an outer product between a column vector of A and a row vector of B can be generated by multiplying each entry of the column vector of A with a copy of the row vector of B in parallel, and output the results as row vectors of the outer product in parallel. The row vectors of the outer product can be stored in the accumulation facility and be reused for a next iteration of MAC operations. The parallel execution of the multiplication and accumulations can improve a speed of the matrix multiply operation.

Figure 1:
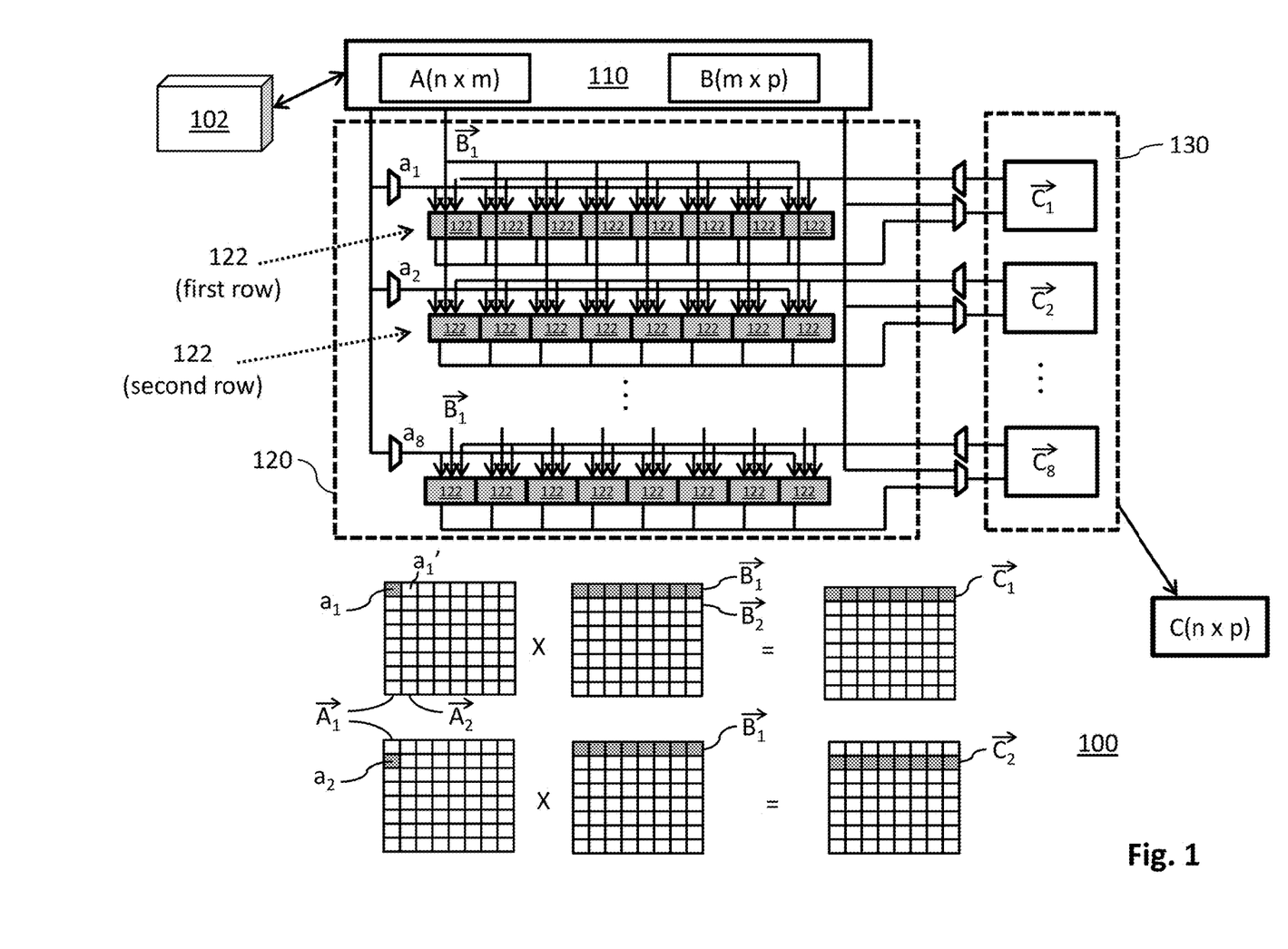
FIG. 1 is a diagram showing an example computer system that can implement half-precision floating-point arrays at low overhead in one embodiment.

FIG. 1 is a diagram showing an example computer system that can implement half-precision floating-point arrays at low overhead in one embodiment. The system 100 can be a part of a computer device. The system 100 can include a processor 102, a register file 110, a register file 130, and a circuit 120. The processor 102 can be a central processing unit of a computer device or a microprocessor. A register file can be an array of processor registers, and can be implemented with random access memory (RAM) or another memory. In some examples, the register file 110 can be separated from the register file 130. In some examples, the register file 130 can be a part of the register file 110. In some examples, one or more of the register file 110, the register file 130, and the circuit 120, can be components of the processor 102.

The register file 110 can be configured to store data, such as a data array denoted as A and a data array denoted as B shown in FIG. 1. The data array A can be represented by a (n×m) matrix, such that the matrix A includes n rows and m columns. The data array B can be represented by a (m×p) matrix, such that the matrix B includes m rows and p columns. The elements or entries of the matrices A and B can be stored in respective registers among the register file 110. A vector of the matrix A, such as a row or column of the matrix A, can be denoted as $\vec{A}$. A vector of the matrix B, such as a row or column of the matrix B, can be denoted as $\vec{B}$.

The circuit 120 can be a multiplier circuit operable to perform multiplication between data arrays or matrices. For example, the circuit 120 can be operable to multiply matrices A and B to produce a data array C, where the data array C can be represented by a (n×p) matrix including n rows and p columns. To be described in more detail below, the circuit 120 can multiply portions of matrices A and B to generate portions of C, and store the portions of C in the register file 130, where the multiplication of the portions can be performed in parallel. The circuit 120 can be further operable to sum or accumulate the portions of C stored in the register file 130 to produce the matrix C.

The circuit 120 can include a plurality of execution units or blocks 122. An execution block 122 can include circuitry operable to perform arithmetic on data of a particular size and/or precision. For example, the execution blocks 122 shown in FIG. 1 can be operable to perform 16-bit arithmetic, such as multiplication. The plurality of execution blocks 122 can include substantially the same circuitry and components. A number of execution blocks 122 can be dependent on a size of the data to be processed or multiplied (e.g., matrices A and B). In an example, if matrices A and B are both 8×8 matrices, then there are 64 execution blocks 122 because a product of two 8×8 matrices can result in a 8×8 matrix with 64 elements or entries. In some examples, a subset of the execution blocks 122 can be activated based on a desired application of the system 100. For example, the system 100 can include 256 execution blocks 122 and a request is received at the processor 102 to multiple two 8×8 matrices. The processor 102 can activate 64 execution blocks out of the 256 execution blocks, and can allocate or assign the activated execution blocks to perform multiplication of entries from the two 8×8 matrices.

In the example shown in FIG. 1, the execution blocks 122 are arranged as 8 rows or sets of 8 execution blocks 122, which is a total of 64 execution blocks. The 64 execution blocks configuration can be used to perform multiplication of two 8×8 matrices, but it is noted that the system 100 can include an arbitrary number of execution blocks and can be designed to perform multiplication of matrices of any size. A row of execution blocks 122 can produce a row vector of matrix C. For example, at an iteration i=1, a first row of execution blocks 122 can receive an entry $a_1$ (or element $A_{1,1}$) of a first column vector $\vec{A}_1$ (including elements $A_{n,1}$) of the matrix A stored in the register file 110. The first row of execution blocks can further receive a row vector $\vec{B}_1$ (including elements $B_{1,p}$), of the matrix B stored in the register file 110. The first row of execution blocks 122 can perform a multiplication of the entry $a_1$ with the row vector $\vec{B}_1$ and add the results to previous values of a row vector $\vec{C}_1$ (including elements $C_{1,p}$ generated from iteration i−1) of the matrix C. Note that for iteration i=1, the elements of C generated from the iteration i−1 are zeroes since iteration i=1 is a first iteration of MAC operations in the matrix multiplication. The circuit 120 or the first row of execution blocks can output $\vec{C}_1$ and store $\vec{C}_1$ in the register file 130.

Similarly, at the iteration i=1, a second row of execution blocks 122 can receive an entry $a_2$ (or element $A_{2,1}$) of the first column vector $\vec{A}_1$ (including elements $A_{n,1}$) of the matrix A stored in the register file 110. The second row of execution blocks can also receive the row vector $\vec{B}_1$ (including elements $B_{1,p}$), of the matrix B stored in the register file 110. The second row of execution blocks 122 can perform a multiplication of the entry $a_2$ with the row vector $\vec{B}_1$ and add the results to previous values of a row vector $\vec{C}_2$ (including elements $C_{2,p}$ generated from iteration i−1) of the matrix C. The circuit 120 or the second row of execution blocks can output $\vec{C}_2$ and store $\vec{C}_2$ in the register file 130.

Since the first row and the second row of execution blocks perform the multiplications independently, they can perform the multiplication in parallel and different row vectors of C can be generated at the same time. For example, $\vec{C}_1$, $\vec{C}_2$, . . . , $\vec{C}_8$ can be generated by respective rows of execution blocks and stored in the register file 130 in parallel. The row vectors $\vec{C}_1$, $\vec{C}_2$, . . . , $\vec{C}_8$ collectively represent the matrix C.

A row of execution blocks 122 can receive a previously generated outer product, and generate a new outer product, and accumulate the new outer product with a previously generate outer product to produce an accumulated outer product. For example, at an iteration i=2, the first row of execution blocks 122 can receive $\vec{C}_1$ generated from iteration i=1 from the register file 130. The first row of execution blocks 122 can also receive an entry $a_1'$ (or element $A_{1,2}$) from a column vector $\vec{A}_2$ (including elements $A_{n,2}$), of the matrix A stored in the register file 110. The first row of execution blocks can also receive a new row vector $\vec{B}_2$ (including elements $B_{2,p}$) of the matrix B stored in the register file 110. The first row of execution blocks 122 can multiply $a_1'$ with the new row vector $\vec{B}_2$, at iteration i=2, and add the results to the row vector $\vec{C}_1$ generated from iteration i=1, producing an accumulated vector that is an update of the row vector $\vec{C}_1$ stored in the register file 130. Other rows of execution blocks 122 are also operable to perform this accumulation and update feature on different combinations of rows and columns of matrices A and B.

By utilizing the register file 130 to store the vectors $\vec{C}_1$, $\vec{C}_2$, . . . , $\vec{C}_8$, the rows of execution blocks 122 can receive vectors from matrices A and B, perform multiplication of the received vectors, and generate row vectors of the outer products in parallel. To be described in more detail below, in one embodiment, the register file 130 can be designed to be separated from the register file 110 yet be in proximity with the execution blocks 122. In another embodiment, partitions of the register file 110 can be utilized as the register file 130 to store the outer products.

Figure 2:
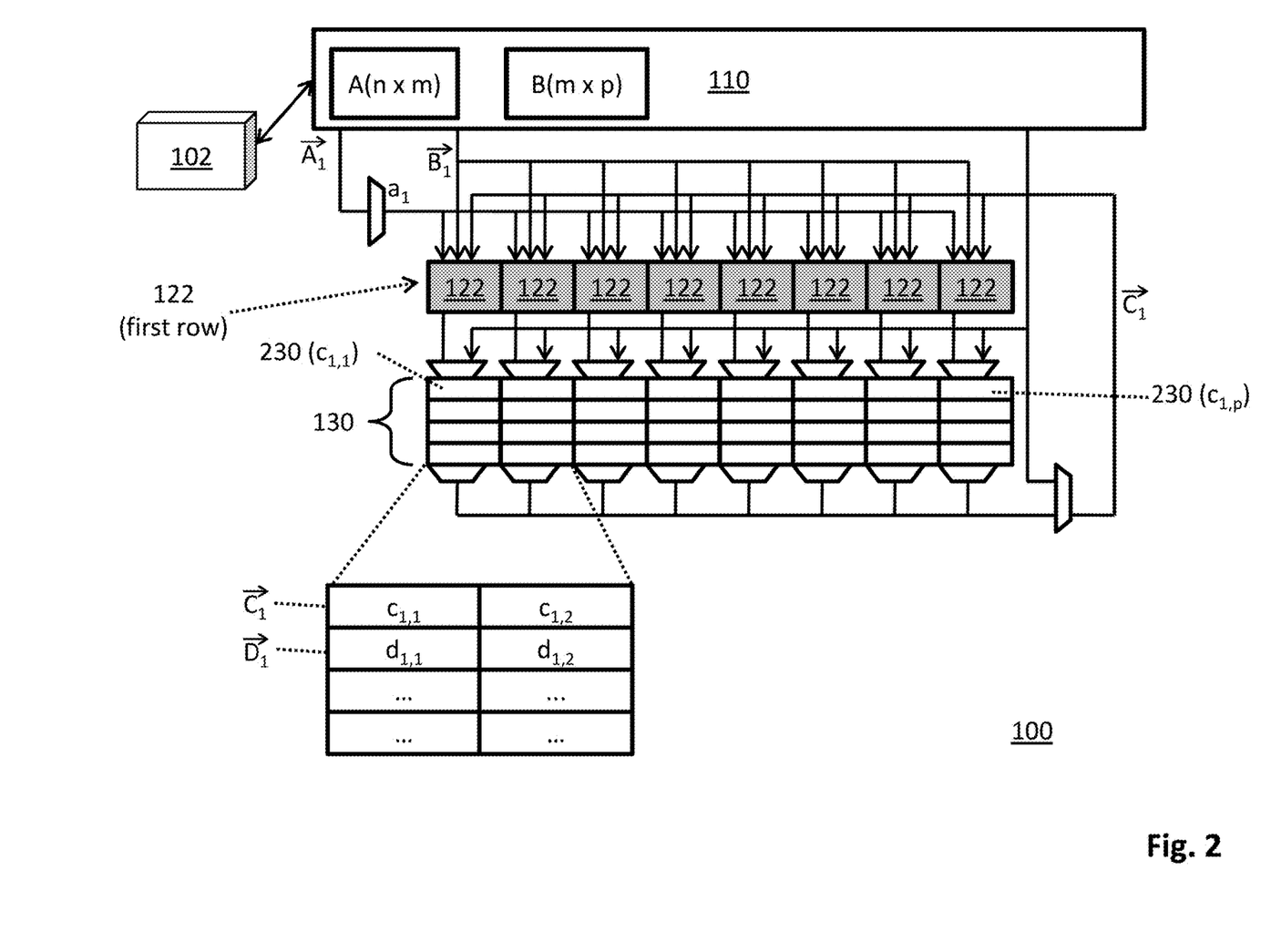
FIG. 2 is a diagram showing an example embodiment of a system that implements half-precision floating-point arrays at low overhead in one embodiment.

FIG. 2 is a diagram showing an example embodiment of a system that implements half-precision floating-point arrays at low overhead in one embodiment. FIG. 2 may include components that are labeled identically to components of FIG. 1, which are not described again for the purposes of clarity. The description of FIG. 2 may reference at least some of the components of FIG. 1.

In an example embodiment shown in FIG. 2, the register file 130 can be a register file separated from the register file 110. The register file 130 can include a plurality of registers 230, which may be processor registers of the processor 102. In some examples, the registers 230 can be integrated with or embedded in the processor 102 to provide the processor 102 with features described herein. In some examples, the registers 230 can be special purpose registers (SPRs), or the register file 130 can be a new register file for specific vector architecture. For example, to implement the multiplication of two 8×8 matrices A and B, the register file 130 can include eight 1024-bit/core registers, or the register file 130 can be a 1024-bit vector register file separated from the register file 110. In the example embodiment shown in FIG. 2, the registers 230 can be located in proximity to the output ports of the first row of execution blocks 122 to provide optimal device sizing and data transmission efficiency.

The execution blocks 122 may take more than one clock cycle to produce new values of C in each iteration, from previous values of C. In an example embodiment, the execution blocks 122 can perform multiplication of different pairs of matrices in different cycles of an instruction pipeline. For example, in a first set of cycles of an instruction pipeline, the first row of execution blocks can multiply $a_1$ with the vector $\vec{B}_1$ and store the outer product $\vec{C}_1$ in a first row of registers 230. In a second set of cycles of the instruction pipeline, the first row of execution blocks can perform multiplication for a new pair of matrices and store an outer product $\vec{D}_1$ of the new pair of matrices in a second row of registers 230. The second set of cycles can overlap the first set of cycles. For example, multipliers of the first row of execution blocks 122 can perform the multiplication of the MAC operation to generate C, then the adders of the first row of execution blocks 122 can perform 1) the addition or accumulation of the MAC operation to generate C and 2) the multiplication of the MAC operation to generate D, in parallel. The operations of the execution blocks 122 can be pipelined to accommodate parallel executions of different matrix multiplications, thus improving an efficiency of the system 100.

Figure 3:
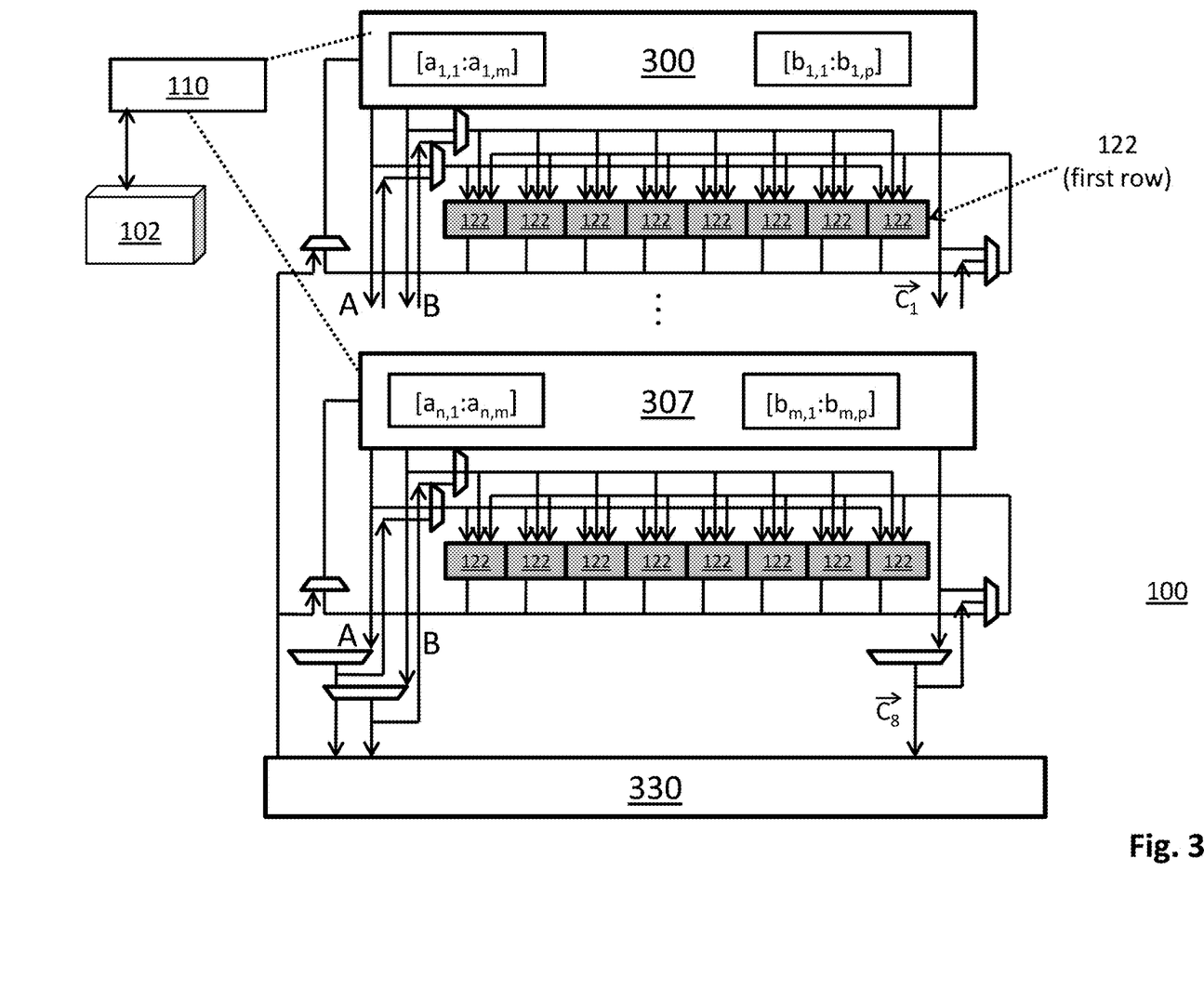
FIG. 3 is a diagram showing an example embodiment of a system that implements half-precision floating-point arrays at low overhead in one embodiment.

FIG. 3 is a diagram showing an example embodiment of a system that implements half-precision floating-point arrays at low overhead in one embodiment. Such configuration may include a row-column arrangement of circuit components. FIG. 3 may include components that are labeled identically to components of FIGS. 1-2, which will not be described again for the purposes of clarity. The description of FIG. 3 may reference at least some of the components of FIGS. 1-2.

In an example embodiment shown in FIG. 3, the register file 110 can be partitioned into a plurality of partitions or banks, such as banks 300 and 307. In an example, the register file 110 can be partitioned into eight 128-bit architected register banks, and overlaying these eight banks with 64 128-bit vector-scalar architected registers 330. The content of the 8 banks can remain the same as the contents that were stored in the register file 110. For example, the register file 110, without partitioning, was configured to store the 8×8 matrices A, B, and C. The register file 110 can be partitioned into eight banks such that each bank stores a row vector of A and a row vector of B. The bank 300 can store a row vector of A including elements ranging from $a_{1,1}$ to $a_{1,m}$, a row vector of B including elements ranging from $b_{1,1}$ to $b_{1,p}$, and a row vector of C including elements ranging from $c_{1,1}$ to $c_{1,p}$. Similarly, the bank 307 can store a row vector of A including elements ranging from $a_{n,1}$ to $a_{n,m}$, a row vector of B including elements ranging from $b_{m,1}$ to $b_{m,p}$, and a row vector of C including elements ranging from $c_{n,1}$ to $c_{n,p}$. The banks partitioned from the first register file can be coupled to a respective row of execution blocks 122. For example, the bank 300 can be coupled to the first row of execution blocks 122.

To implement the matrix multiplication operation described in the present disclosure, in one embodiment, the first row of execution blocks 122 can receive the entry $a_1$ of the first column of A (shown in FIG. 1) from the bank 300 which stores the entries of the first row $A_{1,m}$. The first row of execution blocks 122 can also receive the first row of B from the bank 300, which stores the first row of B. The first row of execution block 122 can multiply $a_1$ with the first row of B to generate $\vec{C}_1$, as described above. The second row of execution blocks (shown in FIG. 1) can be coupled to another bank of the register file 110 storing a second row of A and a second row of B. The second row of execution blocks can receive the entry $a_2$ of the first column of A (shown in FIG. 1) but receives the first row of B from the bank 300 in order to multiply $a_2$ with the first row of B to generate the vector $\vec{C}_2$. The processor 102 can be configured to route contents among the banks partitioned from the register file 110. As a result of the routing, the execution blocks that are not coupled to banks storing a needed entry or vector can receive the needed entry or vector to perform the multiplication assigned to them. The resulting row vectors of C, such as $\vec{C}_1, \ldots, \vec{C}_8$, can be written back into its own bank of the register file 110. Therefore, at each iteration, three read operations are performed on one register bank (e.g., read $a_1$, read $\vec{B}_1$, and read $\vec{C}_0$ from bank 300 at iteration i=1) and one write operation is performed on the same register bank (e.g., write $\vec{C}_1$ to bank 300 at iteration i=1).

In an example, the circuit 120 and the register file 130 can be integrated in the processor 102 to add the parallel multiplication and accumulation operation described herein. The processor 102 with the integrated circuit 120 and the register file 130 can be used to execute and support various applications. In an example, the processor 102 can be used to support machine learning applications that require matrix multiplication at multiple levels of learning and computation, such as deep learning. For example, inputs to the execution blocks 122 can be a convolutional neural network's (CNN) filters and input data to a layer of the CNN. The outer products generated by the processor 102 can be the outputs of the layer of the CNN and can be stored in the registered file 130. The outer product stored in the register file 130 can be fed back into the execution blocks to process a next layer of the CNN.

Figure 4:
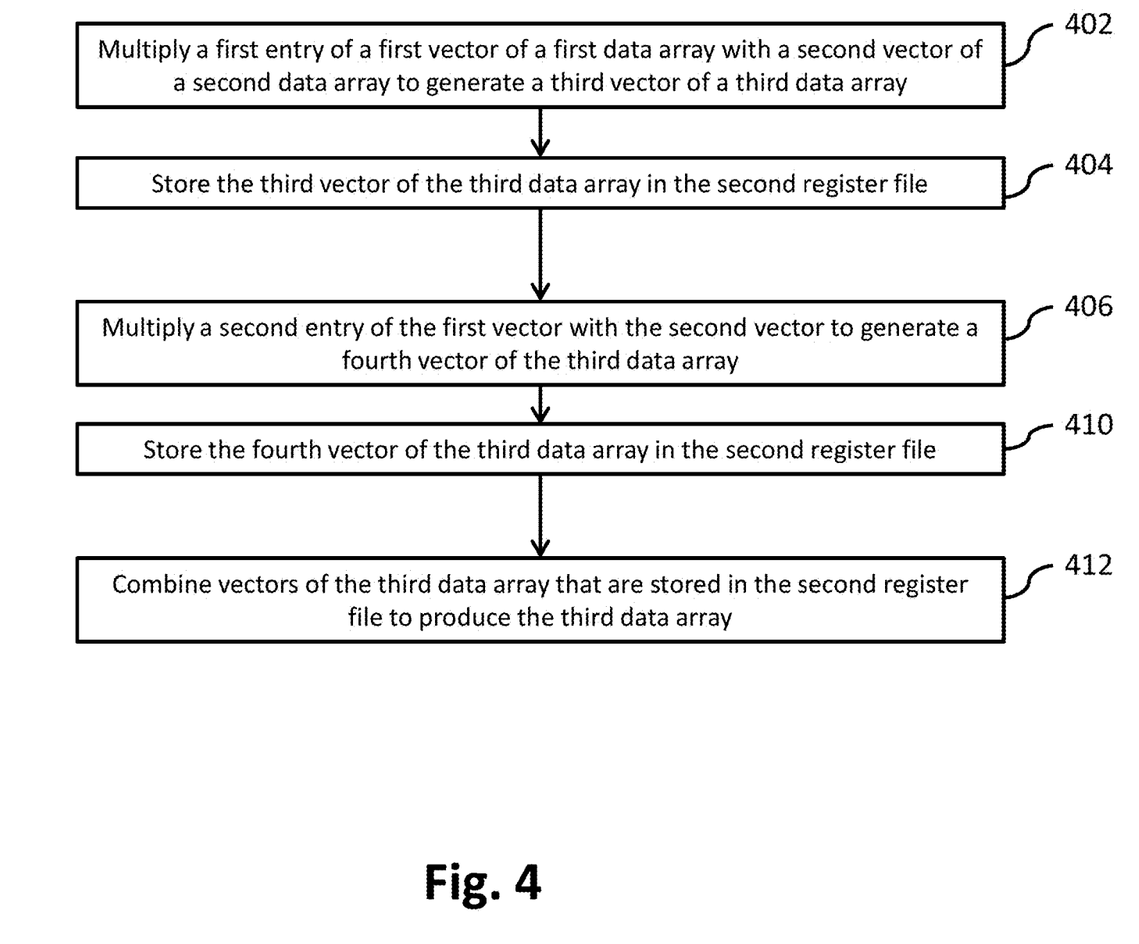
FIG. 4 is a flow diagram illustrating a process that can be performed by a processor to implement half-precision floating-point arrays at low overhead in one embodiment.

FIG. 4 is a flow diagram illustrating a process that can be performed by a processor to implement half-precision floating-point arrays at low overhead in one embodiment. An example process may include one or more operations, actions, or functions as illustrated by one or more of blocks 402, 404, 406, 408, and/or 410. Although illustrated as discrete blocks, various blocks may be divided into additional blocks, combined into fewer blocks, eliminated, or performed in parallel, depending on the desired implementation.

A process can begin at block 402, where a processor can multiply a first entry of a first vector of a first data array with a second vector of a second data array to generate a third vector of a third data array. The process can continue from block 402 to block 404, where the processor can store the third vector of the third data array in the second register file. The first vector can be a column vector of the first data array. The second vector can be a row vector of the second data array. The third data array can be an outer product of the first data array and the second data array. In some examples, the third vector of the third data array can be stored in a first partition of the first register file.

The process can continue from block 402 to block 404, where the processor can multiply a second entry of the first vector with the second vector to generate a fourth vector of the third data array. The process can perform the multiplication of the first entry with the second vector, and the multiplication of the second entry with the second vector, in parallel. The processor can continue from block 402 to block 404, where the processor can store the fourth vector of the third data array in the second register file. In some examples, the fourth vector of the third data array can be stored in a second partition of the first register file. In some examples, the processor can multiply an n-th entry of the first vector with the second vector to generate an (n+2)-th vector of the third data array, and can store the (n+2)-th vector of the third data array in the second register file. The process can continue from block 402 to block 404, where the processor can combine vectors of the third data array that are stored in the second register file to produce the third data array.

In some examples, the processor can multiply a first new entry of a first new vector of the first data array with a second new vector of the second data array to generate a third new vector of a third data array. The processor can further accumulate the third new vector to the received third vector to generate a first accumulated vector of the third data array. The processor can further store the first accumulated vector of the third data array in the second register file. The processor can further multiply a second new entry of the first new vector with the second new vector to generate a fourth new vector of the third data array. The processor can further accumulate the fourth new vector to the received fourth vector to generate a second accumulated vector of the third data array. The processor can further store the second accumulated vector of the third data array in the second register file. The processor can further multiply an n-th new entry of the first new vector with the second new vector to generate a (n+2)th new vector of the third data array. The processor can further accumulate the (n+2)-th new vector to the received (n+2)-th vector to generate an n-th accumulated vector of the third data array. The processor can further store the n-th accumulated vector of the third data array in the second register file.

In some examples, the processor can store the third vector of the third data array in a first partition of the first register file. The processor can further store the fourth vector of the third data array in a second partition of the first register file. The processor can further store the (n+2)-th vector of the third data array in an n-th partition of the first register file.

In some examples, an apparatus can include a register file and a circuitry coupled to the register file. The circuitry can include a plurality of execution blocks. A first set of execution blocks among the plurality of execution blocks can generate a first vector of an outer product between a first data array and a second data array, and can store the first vector in the register file. A second set of execution blocks among the plurality of execution blocks can generate a second vector of the outer product between the first data array and the second data array in parallel with the generation of the first vector by the first set of execution blocks. The second set of execution blocks can store the second vector in the register file. In some examples, an n-th set of execution blocks among the plurality of execution blocks can generate an n-th vector of the outer product between the first data array and the second data array in parallel with the generation of the previous (n−1)-th vectors by the first (n−1) sets of execution blocks, and can store the n-th vector in the register file.

In some examples, the first set of execution blocks can receive a first entry of a vector of the first data array, receive a vector of the second data array, and multiply the first entry with the vector of the second data array to generate the first vector of the outer product. In some examples, the second set of execution blocks can receive a second entry of the vector of the first data array, receive the vector of the second data array, and multiply the second entry with the vector of the second data array to generate the second vector of the outer product. In some examples, the n-th set of execution blocks can receive an n-th entry of the vector of the first data array, receive the vector of the second data array, and multiply the n-th entry with the vector of the second data array to generate the n-th vector of the outer product.

In some examples, the vector of the first data array can be a column vector, the vector of the second data array can be a row vector, the first vector of the outer product can be a first row vector of the outer product, and the second vector of the outer product can be a second row vector of the outer product, and the n-th vector of the outer product can be an n-th row vector of the outer product.

In some examples, the first set of execution blocks can receive a first new entry of a new vector of the first data array, receive a new vector of the second data array, multiply the first new entry with the new vector of the second data array to generate a third vector, and accumulate the generated third vector to the first vector of the outer product to update the first vector of the outer product. In some examples, the second set of execution blocks can receive a second new entry of the new vector of the first data array, receive the new vector of the second data array, multiply the second new entry with the new vector of the second data array to generate a fourth vector, and accumulate the generated fourth vector to the second vector of the outer product to update the second vector of the outer product. In some examples, the n-th set of execution blocks can receive an n-th new entry of the new vector of the first data array, receive the new vector of the second data array, multiply the n-th new entry with the new vector of the second data array to generate an (n+2)-th vector, and accumulate the generated (n+2)-th vector to the n-th vector of the outer product to update the n-th vector of the outer product.

In some examples, a computer program product for multiplying data arrays is generally described. The computer program product may include a computer readable storage medium having program instructions embodied therewith. The program instructions may be executable by a processing element of a device to cause the device to perform one or more methods described herein. For example, the program instructions may be executable by the device to cause the device to multiply a first entry of a first vector of a data array with a second vector of a second data array to generate a third vector of a third data array. The program instructions may be further executable by the device to cause the device to store the third vector of the third data array in the second register file. The program instructions may be further executable by the device to cause the device to multiply a second entry of the first vector with the second vector to generate a fourth vector of the third data array. The program instructions may be further executable by the device to cause the device to store the fourth vector of the third data array in the second register file. The program instructions may be further executable by the device to cause the device to combine vectors of the third data array that are stored in the second register file to produce the third data array.

In some examples, the program instructions may be further executable by the device to cause the device to perform the multiplication of the first entry with the second vector, and the multiplication of the second entry with the second vector, in parallel.

In some examples, The program instructions may be further executable by the device to cause the device to multiply the first entry with the second vector using a first set of execution blocks of the device. The program instructions may be further executable by the device to cause the device to multiply the second entry with the second vector using a second set of execution blocks of the device.

In some examples, the second register file is a first partition of the first register file. The program instructions may be further executable by the device to cause the device to store the third vector of the third data array in a first partition of the first register file. The program instructions may be further executable by the device to cause the device to store the fourth vector of the third data array in a second partition of the first register file.

Figure 5:
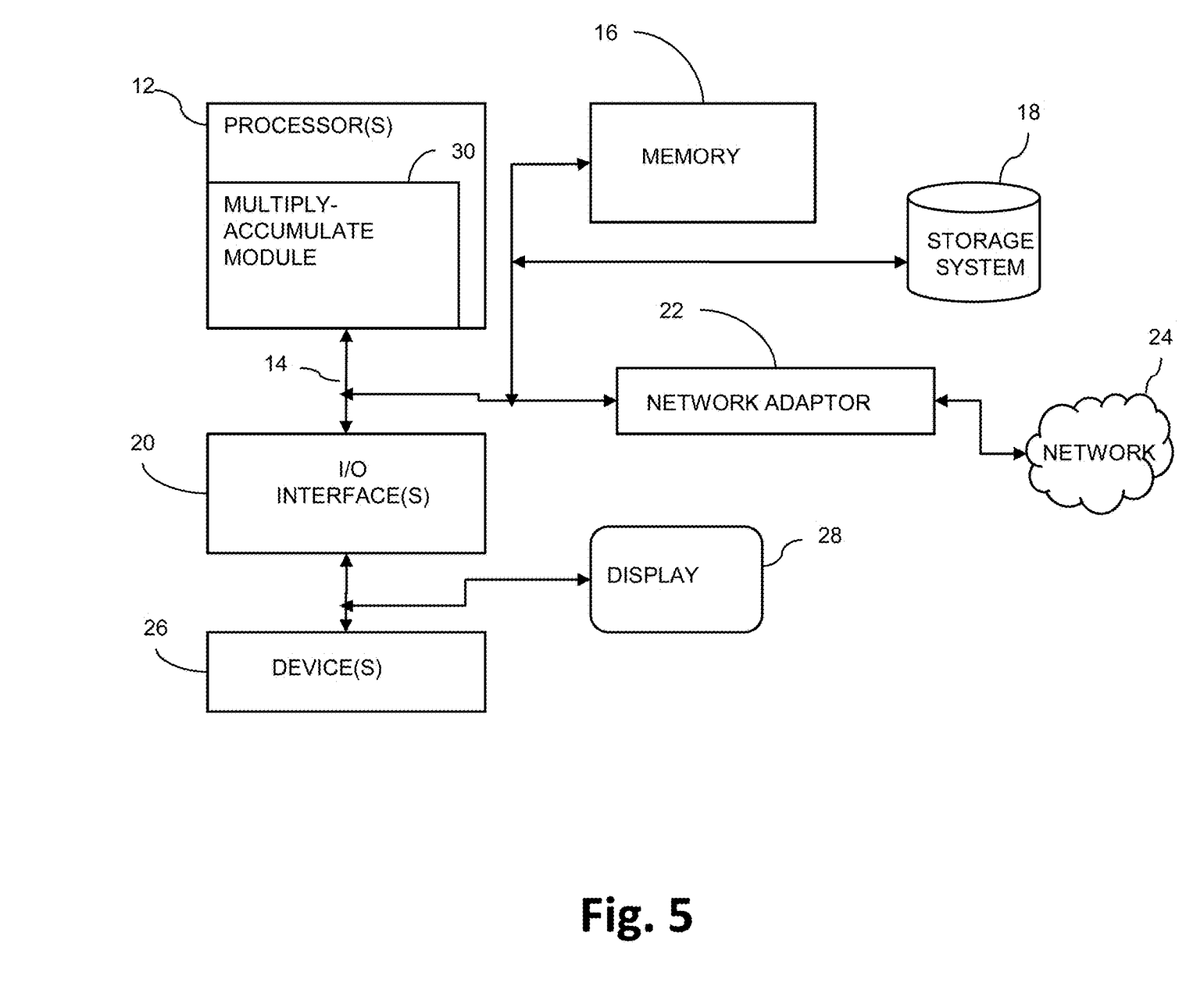
FIG. 5 illustrates a schematic of an example computer or processing system that may implement half-precision floating-point arrays at low overhead in one embodiment

FIG. 5 illustrates a schematic of an example computer or processing system that may implement half-precision floating-point arrays at low overhead in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., multiply-accumulate module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a register file configured to store a first data array and a second data array;
   a circuitry coupled to the register file, the circuitry comprising a plurality of execution blocks;
   wherein a first set of execution blocks among the plurality of execution blocks is operable to use a first entry of a vector of the first data array and a vector of the second data array to generate a first vector of an outer product between the first data array and the second data array, and store the first vector in the register file; and
   wherein a second set of execution blocks among the plurality of execution blocks is operable to use a second entry of the vector of the first data array and the vector of the second data array to generate a second vector of the outer product between the first data array and the second data array in parallel with the generation of the first vector by the first set of execution blocks, and store the second vector in the register file.

2. The apparatus of claim 1, wherein:
   the first set of execution blocks is operable to:
      receive the first entry of the vector of the first data array;
      receive the vector of the second data array; and
      multiply the first entry with the vector of the second data array to generate the first vector of the outer product;
   the second set of execution blocks is operable to:
      receive the second entry of the vector of the first data array;
      receive the vector of the second data array; and
      multiply the second entry with the vector of the second data array to generate the second vector of the outer product.

3. The apparatus of claim 1, wherein the vector of the first data array is a column vector, the vector of the second data array is a row vector, the first vector of the outer product is a first row vector of the outer product, and the second vector of the outer product is a second row vector of the outer product.

4. The apparatus of claim 1, wherein:
   the first set of execution blocks is operable to:
      receive a first new entry of a new vector of the first data array;
      receive a new vector of the second data array;
      multiply the first new entry with the new vector of the second data array to generate a third vector; and
      accumulate the generated third vector to the first vector of the outer product to update the first vector of the outer product;
   the second set of execution blocks is operable to:
      receive a second new entry of the new vector of the first data array;
      receive the new vector of the second data array;
      multiply the second new entry with the new vector of the second data array to generate a fourth vector; and
      accumulate the generated fourth vector to the second vector of the outer product to update the second vector of the outer product.

5. The apparatus of claim 1, wherein the register file is configured to store the first data array, the second data array, and the outer product.

6. The apparatus of claim 1, wherein the register file is separated from another register file configured to store the first data array and the second data array.

7. A system comprising:
a processor;
a first register file configured to be in communication with the processor, the first register file being configured to store a first data array and a second data array;
a second register file configured to be in communication with the processor;
the processor being configured to:
multiply a first entry of a first vector of the first data array with a second vector of the second data array to generate a third vector of a third data array;
store the third vector of the third data array in the second register file;
multiply a second entry of the first vector with the second vector to generate a fourth vector of the third data array;
store the fourth vector of the third data array in the second register file; and
combine vectors of the third data array that are stored in the second register file to produce the third data array.

8. The system of claim 7, wherein the first vector is a column vector of the first data array, the second vector is a row vector of the second data array, and third data array is an outer product of the first data array and the second data array.

9. The system of claim 7, wherein the processor is further configured to perform the multiplication of the first entry with the second vector, and the multiplication of the second entry with the second vector, in parallel.

10. The system of claim 7, wherein:
the processor comprises a plurality of execution blocks;
the first entry of the of the first vector and the second vector are received by a first set of execution blocks;
the multiplication of the first entry with the second vector is performed by the first set of execution blocks;
the second entry of the of the first vector and the second vector are received by a second set of execution blocks; and
the multiplication of the second entry with the second vector is performed by the second set of execution blocks.

11. The system of claim 7, wherein:
the processor comprises a plurality of execution blocks;
a first set of execution blocks is operable to:
multiply a first new entry of a first new vector of the first data array with a second new vector of the second data array to generate a third new vector of a third data array;
accumulate the third new vector to the received third vector to generate a first accumulated vector of the third data array;
store the first accumulated vector of the third data array in the second register file;
a second set of execution blocks is operable to:
multiply a second new entry of the first new vector with the second new vector to generate a fourth new vector of the third data array;
accumulate the fourth new vector to the received fourth vector to generate a second accumulated vector of the third data array; and
store the second accumulated vector of the third data array in the second register file.

12. The system of claim 7, wherein the first register file is partitioned into a number of banks, and the second register file is a bank among the number of banks.

13. The system of claim 12, wherein:
the third vector of the third data array is stored in the first bank of the first register file; and
the fourth vector of the third data array is stored in a second bank of the first register file.

14. The system of claim 12, wherein:
the first entry of the first vector is received from the first bank of the first register file;
the second vector of the second data array is received from the first bank of the first register file; and
the second entry of the first vector is received from a second bank of the first register file.

15. The system of claim 12, wherein the processor is further configured to route data among the number of banks of the first register file.

16. A computer-implemented method comprising:
multiplying, by a processor, a first entry of a first vector of a first data array with a second vector of a second data array to generate a third vector of a third data array;
storing, by the processor, the third vector of the third data array in a register file;
multiplying, by the processor, a second entry of the first vector with the second vector to generate a fourth vector of the third data array;
storing, by the processor, the fourth vector of the third data array in the register file; and
combining, by the processor, vectors of the third data array that are stored in the register file to produce the third data array.

17. The computer-implemented method of claim 16, wherein the first vector is a column vector of the first data array, the second vector is a row vector of the second data array, and third data array is an outer product of the first data array and the second data array.

18. The computer-implemented method of claim 16, further comprising performing, by the processor, the multiplication of the first entry with the second vector, and the multiplication of the second entry with the second vector, in parallel.

19. The computer-implemented method of claim 16, further comprising:
multiplying, by the processor, a first new entry of a first new vector of the first data array with a second new vector of the second data array to generate a third new vector of a third data array;
accumulating, by the processor, the third new vector to the received third vector to generate a first accumulated vector of the third data array;
storing, by the processor, the first accumulated vector of the third data array in the second register file;
multiplying, by the processor, a second new entry of the first new vector with the second new vector to generate a fourth new vector of the third data array;
accumulating, by the processor, the fourth new vector to the received fourth vector to generate a second accumulated vector of the third data array; and
storing, by the processor, the second accumulated vector of the third data array in the second register file.

20. The computer-implemented method of claim 16, wherein the register file is a first partition of another register file, and the method further comprising:

storing, by the processor, the third vector of the third data array in the first partition of said another register file; and storing, by the processor, the fourth vector of the third data array in a second partition of said another register file.

\* \* \* \* \*